(12) United States Patent
Flammer

(10) Patent No.: US 8,238,702 B2
(45) Date of Patent: Aug. 7, 2012

(54) HYBRID DIELECTRIC/SURFACE PLASMON POLARITON WAVEGUIDE WITH GRATING COUPLING

(75) Inventor: P. David Flammer, Golden, CO (US)

(73) Assignee: Colorado School of Mines, Golden, CO (US)

(*) Notice: Subject to any disclaimer, the term of this patent is extended or adjusted under 35 U.S.C. 154(b) by 389 days.

(21) Appl. No.: 12/455,710

(22) Filed: Jun. 5, 2009

(65) Prior Publication Data

US 2010/0014808 A1    Jan. 21, 2010

Related U.S. Application Data

(60) Provisional application No. 61/059,016, filed on Jun. 5, 2008.

(51) Int. Cl.
  *G02B 6/10* (2006.01)
  *G02B 6/34* (2006.01)
  *B05D 5/06* (2006.01)
  *H01L 21/02* (2006.01)
  *G01N 21/55* (2006.01)
  *G01J 3/28* (2006.01)

(52) U.S. Cl. .......................... 385/37; 356/328

(58) Field of Classification Search .......... 385/37, 385/39, 42, 129, 12, 131; 429/163.2; 372/43, 372/46, 54, 64, 96, 102, 6; 427/163.2; 430/314, 430/319; 435/5, 29; 356/328, 364, 445
See application file for complete search history.

(56) References Cited

U.S. PATENT DOCUMENTS

| | | | | |
|---|---|---|---|---|
| 4,583,818 A | * | 4/1986 | Chen et al. | 385/37 |
| 4,787,690 A | * | 11/1988 | Maerz | 385/132 |
| 6,501,783 B1 | * | 12/2002 | Capasso et al. | 372/96 |
| 6,987,913 B2 | * | 1/2006 | Blauvelt et al. | 385/50 |
| 7,010,183 B2 | * | 3/2006 | Estes et al. | 385/14 |
| 7,072,553 B2 | * | 7/2006 | Johnson et al. | 385/127 |
| 7,400,399 B2 | * | 7/2008 | Wawro et al. | 356/328 |
| 7,454,095 B2 | * | 11/2008 | Baehr-Jones et al. | 385/14 |
| 7,567,606 B2 | * | 7/2009 | Carras et al. | 372/50.11 |
| 7,577,327 B2 | * | 8/2009 | Blauvelt et al. | 385/39 |
| 7,636,502 B2 | * | 12/2009 | Mao et al. | 385/12 |
| 7,670,758 B2 | * | 3/2010 | Wang et al. | 430/321 |
| 7,679,748 B2 | * | 3/2010 | Chen et al. | 356/445 |
| 2005/0135453 A1 | * | 6/2005 | Kneissl et al. | 372/94 |
| 2010/0119192 A1 | * | 5/2010 | Fujikata et al. | 385/14 |
| 2010/0128273 A1 | * | 5/2010 | Lee et al. | 356/445 |
| 2011/0222564 A1 | * | 9/2011 | Belkin et al. | 372/20 |

* cited by examiner

*Primary Examiner* — Akm Ullah
(74) *Attorney, Agent, or Firm* — Sheridan Ross P.C.

(57) ABSTRACT

The present invention provides a hybrid dielectric/SPP waveguide that can form either a single mode, single polarization waveguide, or a multi-mode waveguide. When multi-mode, this invention effectively transfers energy back and forth between the dielectric waveguide and metal surface. This improves on standard SPP modes, yielding longer range propagation along with high intensity near the metal surface at decisive locations. When single-mode, this hybrid waveguide allows for control of propagation and confinement for applications such as telecommunications optics integrated on silicon microchips. Gratings may be patterned in the metal for coupling light into and out of the modes or for use as mirrors in the mode. For areas where very long ranges are required, a metal grating may be used to couple light into the mode, but then the metal may be removed in other regions and make the range of the mode virtually infinite (limited by surface roughness).

10 Claims, 12 Drawing Sheets

HYBRID DIELECTRIC/SURFACE PLASMON POLARITON WAVEGUIDE WITH GRATING COUPLING

CROSS-REFERENCE TO RELATED APPLICATION

This Application claims the benefit of U.S. Provisional Application No. 61/059,016, filed Jun. 5, 2008, the entire disclosure of which is hereby incorporated herein by reference.

The U.S. Government has a paid-up license in this invention and the right in limited circumstances to require the patent owner to license others on reasonable terms as provided for by the terms of DMI-0522281 awarded by the National Science Foundation and FA9550-06-1-0548 awarded by the Air Force Office of Scientific Research.

FIELD OF THE INVENTION

The invention generally related to waveguides and more particularly to Surface Plasmon Polariton (SPP) waveguides.

BACKGROUND OF THE INVENTION

Many waveguide designs have been used in an attempt to create a very long-range mode that has low losses while maintaining the ability to have a high signal near a metal surface at a predetermined location. More specifically, various surface plasmon polariton (SPP) waveguides have been developed with different shapes/thicknesses of metal films, including a simple dielectric waveguide structure (a high index layer) on top of or surrounding a metal film to aid in field confinement. However, all of these waveguides retain the simple problem that as the field is concentrated, it is concentrated most at the metal, and hence the losses increase dramatically and the propagation lengths accordingly decrease.

Likewise, waveguides have also been designed to couple received light into a particular waveguide mode (e.g., via a grating). In fact, many studies have been performed that look at grating coupling into SPP modes. However, for these designs, the efficiency is low because the grating meant to couple light into the mode almost as effectively couple light back out of the mode.

A third design consideration in the production of waveguides is in the creation of Bragg mirrors for the mode. More specifically, Bragg mirrors are generally designed to limit the energy lost due to diffraction out of the mode or losses in the mirrors. Gratings have been used with standard SPP modes as Bragg mirrors, but these designs have significant losses due to diffraction.

SUMMARY

It is, therefore, an object of the present invention to provide a hybrid dielectric/SPP waveguide that overcomes all of the above-noted deficiencies in the prior art. More specifically, waveguide designs according to embodiments of the present invention include a hybrid dielectric/SPP waveguide, a grating to scatter light into or out of the hybrid waveguide where the grating also may act as a very effective Bragg mirror for guiding, and a combination of two sets of Bragg mirrors may form resonant cavities in the device.

When the hybrid waveguide is multi-mode, embodiments of the present invention provide for effectively transferring energy back and forth between being concentrated in the dielectric waveguide and near the metal. This improves on standard SPP modes, yielding longer range propagation along with high intensity near the metal surface at decisive locations. For areas where very long ranges are required, the metal may be removed to make the range of the mode virtually infinite (limited by surface roughness).

Combining a grating with the hybrid waveguide provides one efficient and easily fabricated method for scattering light into the mode. This grating may have a rectangular profile, triangular profile, sinusoidal, or any other kind of profile to tune coupling efficiency. Simulations of designs have demonstrated 85% of the theoretical maximum of light transfer into the mode over a large collection area, which represents an extreme gain over conventional grating coupling of light into conventional SPP modes. Moreover, the utilization of two gratings to form a resonant cavity that further focuses the light to high intensity has been studied and can be achieved.

SPP waveguide designs utilized in accordance with at least some embodiments of the present invention partially overcome the problem that as the field is concentrated losses go up and propagation lengths go down. This improvement may be realized by decoupling the energy away from the metal surface in a dielectric waveguide with a "cladding" region between the metal and the dielectric waveguide. Depending on the thickness of the cladding region and dielectric waveguide, and for polarization states where the magnetic field is parallel to the surfaces, either a single mode hybrid waveguide or a multi-mode hybrid waveguide can be formed. In the case of a multi-mode hybrid waveguide, the energy can be catered to pass between being concentrated in the dielectric waveguide core and being concentrated at the metal surface. Therefore, at certain locations a high intensity of energy is concentrated at the metal surface, but the average intensity in the metal is lower than other designs leading to lower loss and longer propagation.

In addition, the efficiency of coupling light into the hybrid dielectric/SPP waveguide structure may be improved over prior art waveguides. Rather, in the various embodiments of the present invention, light very effectively couples in, making the design of these embodiments superior with respect to efficiency. Moreover, the mirrors utilized in accordance with embodiments of the present invention are very effective in reflecting energy back into the mode with lower diffractive loss as mentioned above.

The dielectric/SPP waveguide structure may be utilized in a number of different applications. Some exemplary applications that might employ a dielectric/SPP waveguide structure include, but are not limited to the following: 1) Bio-sensors (e.g. surface enhanced Raman detectors) able to detect small amounts of materials due to the high concentration of signal; 2) Simultaneous or individual filtering of polarization and color without external filtering; 3) Sensors or arrays of sensors such as Charge Coupled Devices (CCDs) with the filters mentioned above patterned on top of the sensor; 4) Non-contact electric field sensors using electro-optic materials; 5) 3-D imaging similar to confocal imaging; 6) Waveguiding in silicon or other semiconductors used for micro-chip/optical signal integration particularly at telecommunications wavelengths; and 7) Optical modulators. When used in an optical modulator, the dielectric/SPP waveguide is utilized with some device for modulation as an optical switch for controlling signals at a number of different wavelengths. For example, a dielectric/SPP waveguide may be coupled with a diode or other electrical device that changes the effective index of the mode for use as a telecommunications switch. Alternatively, the parameters of the dielectric/SPP waveguide structure could be configured for use in an optical switch in other applications, e.g., using an electro-optic material such as lithium niobate or a polymer.

In accordance with at least one embodiment of the present invention a hybrid waveguide is provided that comprises:
   a metal layer;
   a dielectric waveguide layer; and
   a cladding layer disposed between the metal layer and the dielectric waveguide layer.

Additional features and advantages of embodiments of the present invention will become more readily apparent from the following description, particularly when taken together with the accompanying drawings.

DETAILED DESCRIPTION

Figure 1:
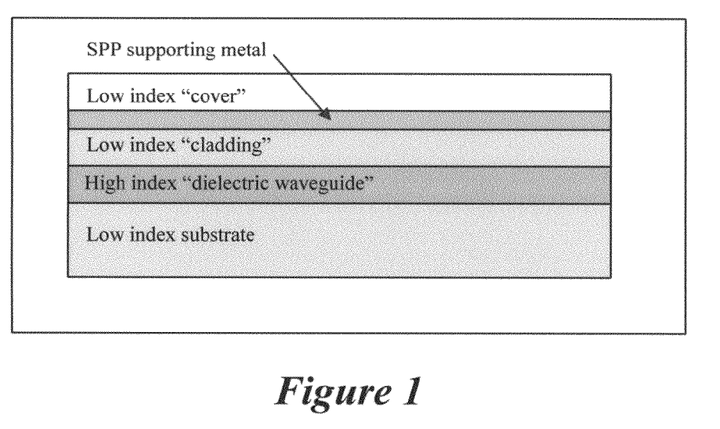
FIG. 1 depicts a cross-sectional view of an exemplary dielectric/SPP waveguide structure in accordance with at least some embodiments of the present invention.

FIG. 1 shows components of the dielectric/SPP waveguide structure in accordance with at least some embodiments of the present invention:

1) A bulk material (called substrate in the figure).
2) A "dielectric waveguide" layer made of material with higher index than the substrate.
3) A "cladding" layer with index lower than the dielectric waveguide layer.
4) A metal layer (also referred to as the SPP layer) that is a good conductor over the spectral range of interest. This can be made very thin in order to increase the range of the surface plasmon mode, or may be made thick to confine propagation to one side of the metal.
5) A "cover" layer typically of index lower than the dielectric waveguide layer. If the metal layer is thick enough that the SPP mode is one sided, it doesn't matter what the index of this layer is; if the metal is thin to decrease metallic losses, then the index should be lower than the dielectric waveguide layer. This could be air (no cover layer).

The thicknesses and indices of these materials are set based on the following criteria:

1) The thicker the cladding region and the larger the index contrast between the cladding region and the dielectric waveguide region decreases losses in the metal, but at the same time decreases coupling between the surface plasmon mode on the metal and the dielectric waveguide mode. Therefore, depending on whether one wants stronger coupling and lower propagation length, or weaker coupling but longer propagation lengths, these parameters are set.
2) The index contrast between the substrate layer and the dielectric waveguide also play a role, and can be modified to balance the two goals (long range mode, or strong coupling between the dielectric waveguide mode and surface plasmon mode).

As an example, the low index substrate layer may be composed of glass, Silica, plastic, or any other relatively transparent material at the frequencies of interest. Even air or liquid may be used if a method of fabricating free standing structures is available. Alternatively, the low index substrate layer may include a Lithium Niobate substrate or another electro-optic material such as a polymer, especially when used in applications where an electro-optic effect is necessary. The high index dielectric waveguide layer may include, without limitation, Silicon Nitride, Silica, Titanium doped Lithium Niobate (for cases where the substrate layer is a Lithium Niobate substrate), other electro-optic materials such as polymers, silicon (particularly for telecommunications wavelength applications), or any other material that has a relatively high index of refraction with respect to the substrate. The low index cladding layer may include, without limitation, Silicon Nitride, Silica, or any other material that has a lower index of refraction than the high index dielectric waveguide layer. The differences in indices between the dielectric waveguide layer and the cladding layer may be as little as about a 1% difference or as large as material properties permit. The SPP layer may include, for example, gold (for use with incident light wavelengths ranging from yellow to IR), platinum, silver (for use with incident light wavelengths ranging from visible to IR), aluminum (possibly for applications with silicon), copper (possibly for applications with silicon), or any similar material or combination of materials.

In one embodiment of the present invention, the cladding layer may have an index of refraction equal to about 1.5 and the dielectric waveguide layer may have an index of refraction equal to about 1.8. These particular materials may be especially useful in visible to IR applications where the wavelength of light can vary from IR through the visible range all the way to near ultraviolet. In another embodiment, the cladding layer may have an index of refraction equal to about 1.5 whereas the dielectric waveguide layer may have an index of refraction equal to about 3.5. This particular combination of materials may be useful in telecommunications applications where IR or near IR wavelengths are typically used to transmit data. It should be noted that if there is a bigger difference between the indices of refraction for the cladding and dielectric waveguide layers, then it may be necessary to decrease the thickness of the cladding layer relative to the dielectric waveguide layer. The converse may also be true. More specifically, if there is a small difference between the indices of refraction for the cladding and dielectric waveguide layers, then it may be necessary to utilize a relatively thicker cladding layer.

Fabrication can be achieved by depositing layers of materials on top of a bulk substrate. The materials may be laid down using, e.g., evaporative deposition, chemical deposition, atomic layer deposition, or other deposition techniques.

Figure 2:
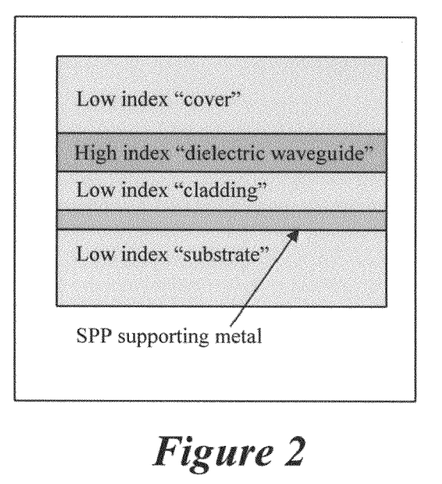
FIG. 2 depicts a cross-sectional view of an alternative design of the dielectric/SPP waveguide structure in accordance with at least some embodiments of the present invention.
Figure 3:
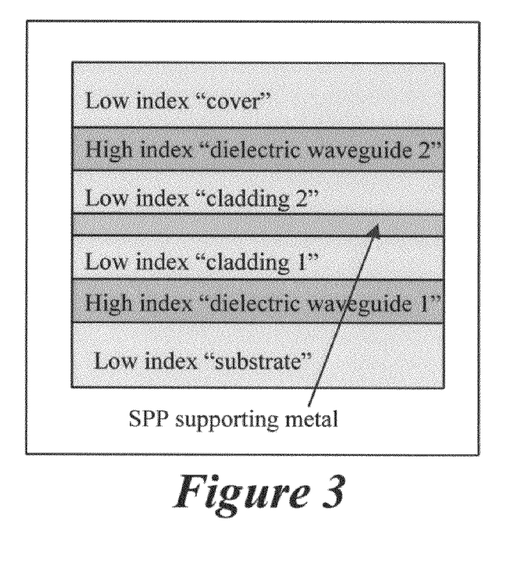
FIG. 3 depicts a cross-sectional view of a double-sided dielectric/SPP waveguide structure in accordance with at least some embodiments of the present invention.

FIGS. 2-3 show a number of variations on the design in FIG. 1 that may be useful. FIG. 2 consists of the same design concept but reverses the order of fabrication, i.e., the metal is laid first, then cladding, then the dielectric waveguide layer, and possibly a cover. FIG. 3 consists of a dual sided structure. In addition to this structure other stacked structures can be envisioned such as deposition of another metal on the structure of FIG. 2, or repeated deposition of the structure onto itself.

Figure 4:
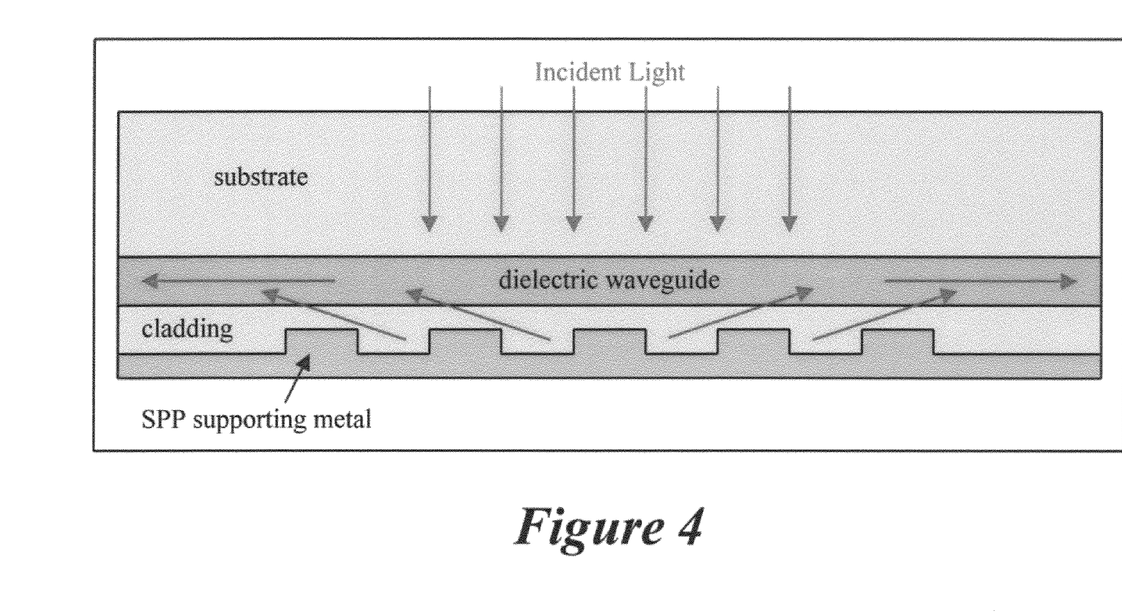
FIG. 4 depicts a cross-sectional view of a dielectric/SPP waveguide structure including a grating in accordance with at least some embodiments of the present invention.

FIG. 4 shows a diagram of how a grating may be combined with the hybrid waveguide structure to couple light into the hybrid waveguide. FIG. 4 is upside down with respect to FIG. 1 to match the simulation images that follow.

Once again, the thicknesses of the layers and index contrasts play a role of how well this coupling is achieved. Weaker coupling means that one needs a larger grating to effectively couple light into the hybrid waveguide, but the overall effectiveness when the size of the grating is optimized is better than for stronger, smaller sized coupled gratings. Stronger coupling means that one can use a smaller grating, but the overall efficiency when trying to collect over a large area suffers. Simulations have shown transmissions of energy reaching 85% of the theoretical maximum for a collection region of 50 microns at a free space wavelength of 800 nm light normally incident. In addition, changing the incident angle of the light can affect what wavelength will most effectively couple to the dielectric/SPP waveguide structure, as well as the directionality of the coupling.

As a specific example of grating coupling, a design using glass as the substrate (n=1.5), silicon nitride (SiNx, n=1.8) as the as the dielectric waveguide layer substance, and silicon oxide (SiO2, n=1.5) as the cladding substance was tested. With a grating etched into the cladding layer with periodicity of 500 nm, depth of 100 nm, and a duty cycle of 50%, finite element simulations of the response of this structure were performed for normally incident light. This design has been observed to couple light most effectively into the hybrid waveguide at a free space wavelength of about 800 nm.

Figure 5:
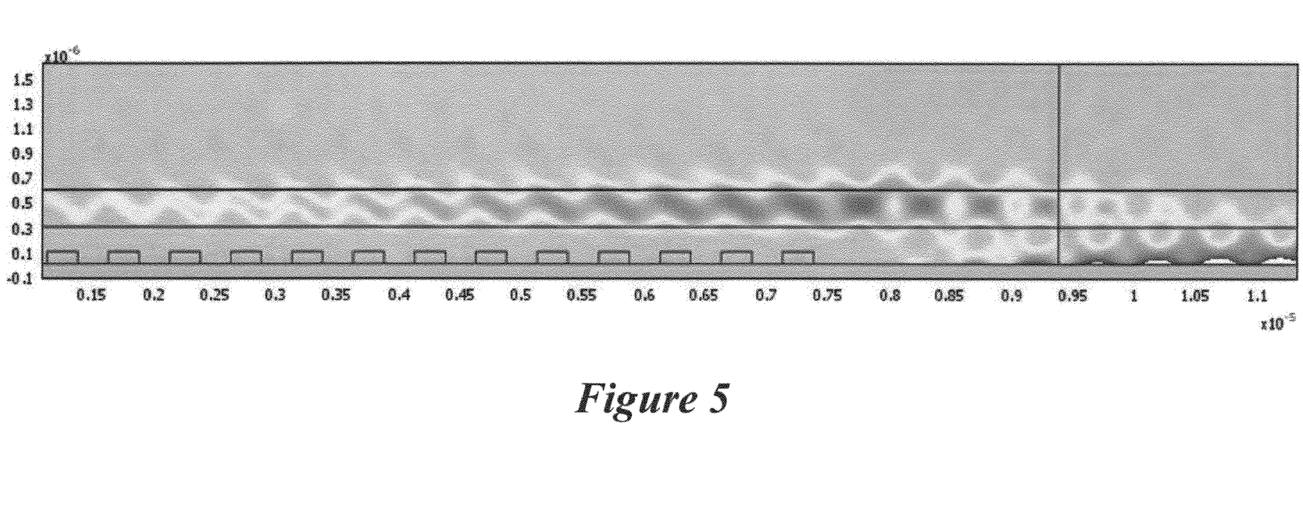
FIG. 5 depicts simulation results for time averaged power flow in a dielectric/SPP waveguide structure including a grating in accordance with at least some embodiments of the present invention.

FIG. 5 shows the power flow for an FEM simulation of time-averaged power flow with a 30-groove grating coupler at 802 nm free space wavelength normally incident light. The scale varies from green (0) to deep red (30 times the incident power flow), and white is anything above that. The grating consists of 30 grooves (not all shown). Energy is coupled into the dielectric waveguide and then transferred to the metal surface creating very high intensities at the metal surface.

Figure 6:
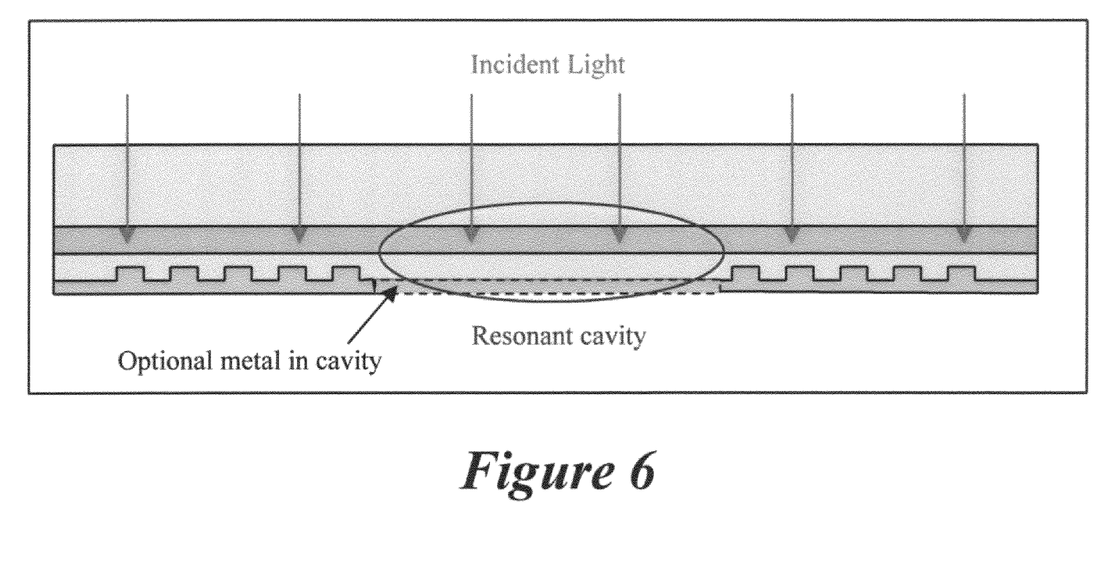
FIG. 6 depicts a cross-sectional view of a dielectric/SPP waveguide structure including a grating and a resonant cavity in accordance with at least some embodiments of the present invention.

FIG. 6 shows how two gratings may be used together to make a resonant cavity with extremely high field intensities inside of the cavity. Metal may be left in cavity for focusing energy at the metal surface or left out yielding a higher Q cavity. Simulated energy densities at the surface of the metal of up to 500 times the incident energy have been predicted.

Figure 7:
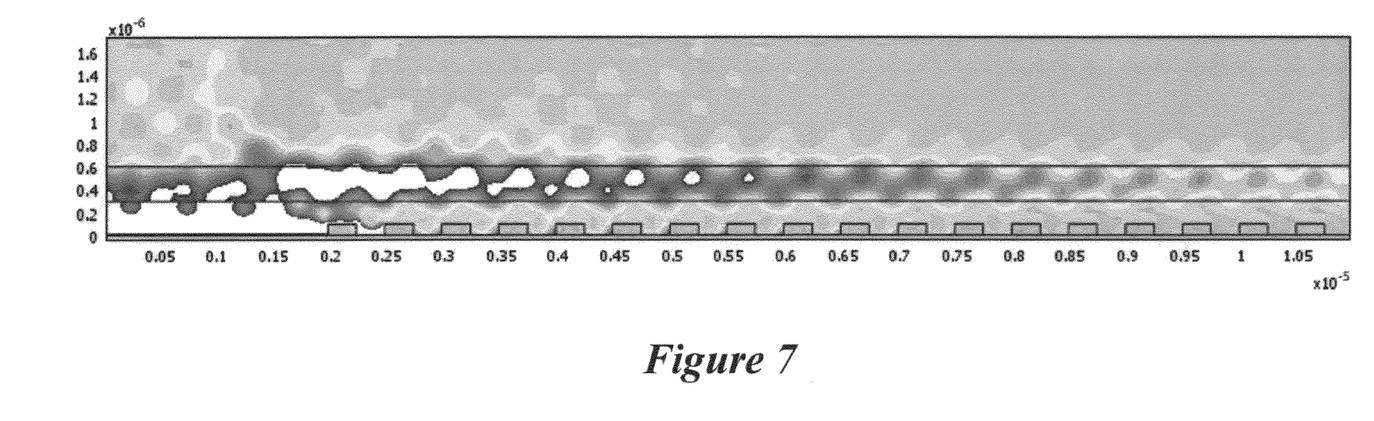
FIG. 7 depicts simulation results for time averaged energy density due to two grating couplers that couple light into the dielectric/SPP waveguide and then serve as mirrors to form a resonant cavity in accordance with at least some embodiments of the present invention.

FIG. 7 shows a time-averaged energy density when two gratings (30 grooves per grating) are combined to form a resonant cavity. The gratings can serve the double purpose of coupling light into the mode while also acting as mirrors creating the resonant cavity. For clarity, only the right half of the symmetric structure is shown in FIG. 7, although embodiments of the present provide for a left half that is an identical mirror image of the right half. The scale varies from green (0) to deep red (30 times the incident power flow), and white is anything above that. The combination of two gratings increases the energy density dramatically.

Figure 8:
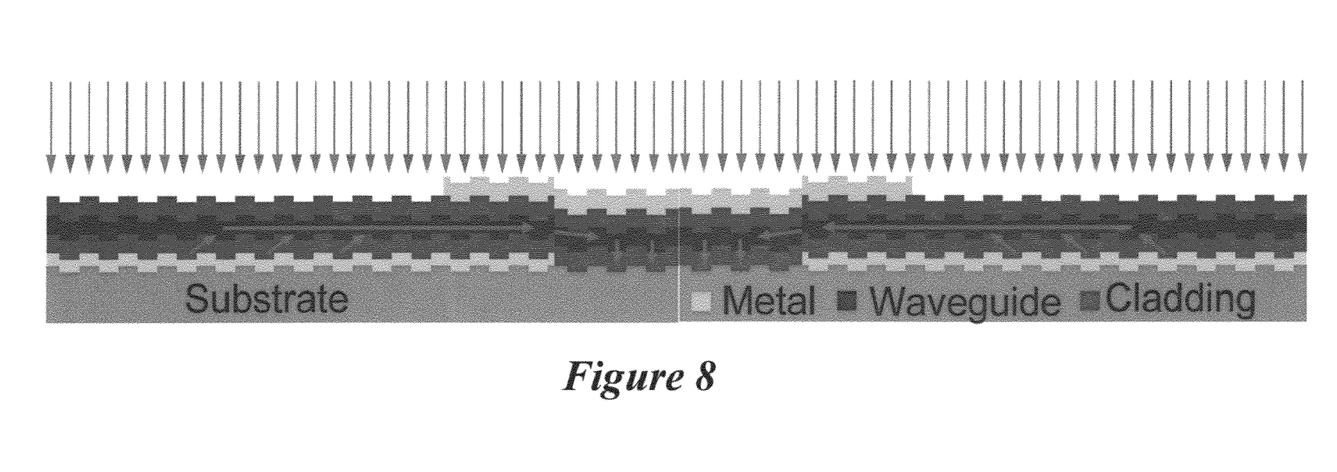
FIG. 8 depicts a cross-sectional view of a dielectric/SPP waveguide structure with a grating structure that pervades the metal, cladding and dielectric waveguide layers consistent with some types of fabrication methods in accordance with at least some embodiments of the present invention.

Because fabrication methodology may require the reverse fabrication procedure of depositing the metal before the cladding and dielectric waveguide layer (see FIG. 2), the grating for coupling may exist in all the layers. FIG. 8 shows one application that has been studied where the reverse fabrication creates grooves in all layers. This particular structure was created for color filtering. The grating is fabricated in the substrate, and then the metal, cladding, dielectric waveguide, and cover are laid onto the structure. In addition to this a metal shield is placed above the structure for the sake of shielding the aperture from unwanted light, and coupling the light out of the hybrid structure to the substrate below.

Figure 9:
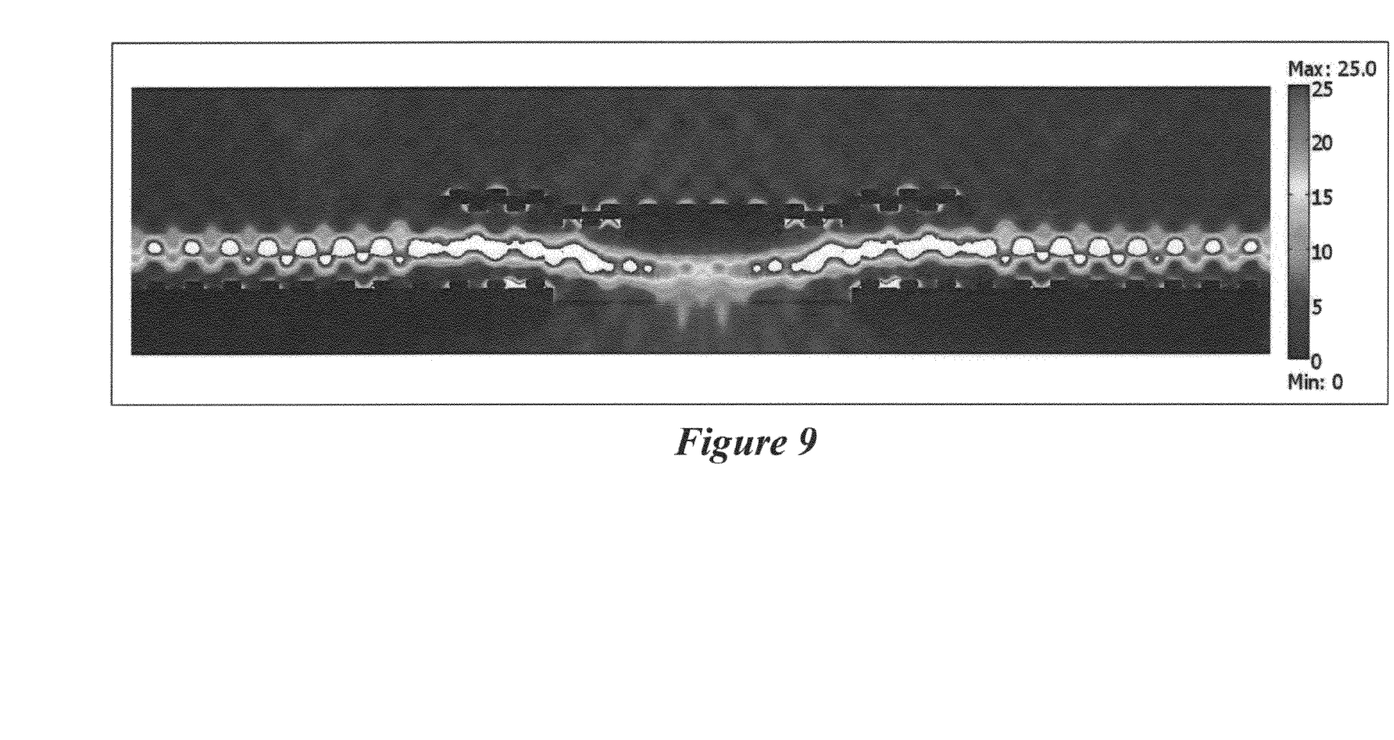
FIG. 9 depicts simulation of energy behavior in the device of FIG. 8 as applied to color filtering in accordance with at least some embodiments of the present invention.

FIG. 9 shows a finite element model of the power flow of light incident on the structure of FIG. 8, depicting the focusing and transmission of light at the wanted color into the substrate. By way of example, in one implementation, the substrate could be a CCD to collect the light.

Figure 10:
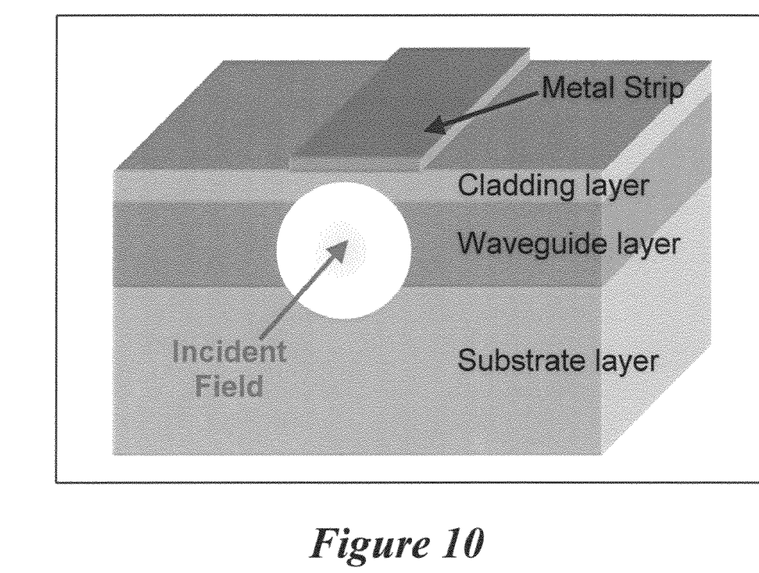
FIG. 10 is a perspective view of a dielectric/SPP waveguide design that yields confinement in the dielectric waveguide layer perpendicular to propagation in accordance with at least some embodiments of the present invention.

For two-dimensional confinement of the mode, the design can be augmented to 3 dimensions by replacing the gold film with a gold strip. FIG. 10 shows a 3-dimensional view of how the geometry may look to give confinement in the dielectric waveguide layer perpendicular to propagation. An alternative approach comprises keeping the metal extent infinite, while making either or both of the cladding and waveguide layers confined to a strip.

It has been proposed to utilize the above type of 2-D confinement for silicon compatible optical waveguides. If a silicon-on-insulator (SOI) wafer is used, then that forms a similar structure to that shown in FIG. 10. The substrate layer would be a buried insulator layer in the SOI wafer (n less than or about 2); the thicker this layer, the better, and standard bonded wafers can have buried oxide layers of up to 4 microns. The dielectric waveguide layer would be the device silicon layer (n~3.5). The cladding layer would be a very thin layer of oxide such as silicon oxide (SiO2) or hafnium oxide (HfO2) with a thickness in the range of typically 2 nm-50 nm. The metal strip width can be tuned to control the lateral confinement of the mode.

Figure 11:
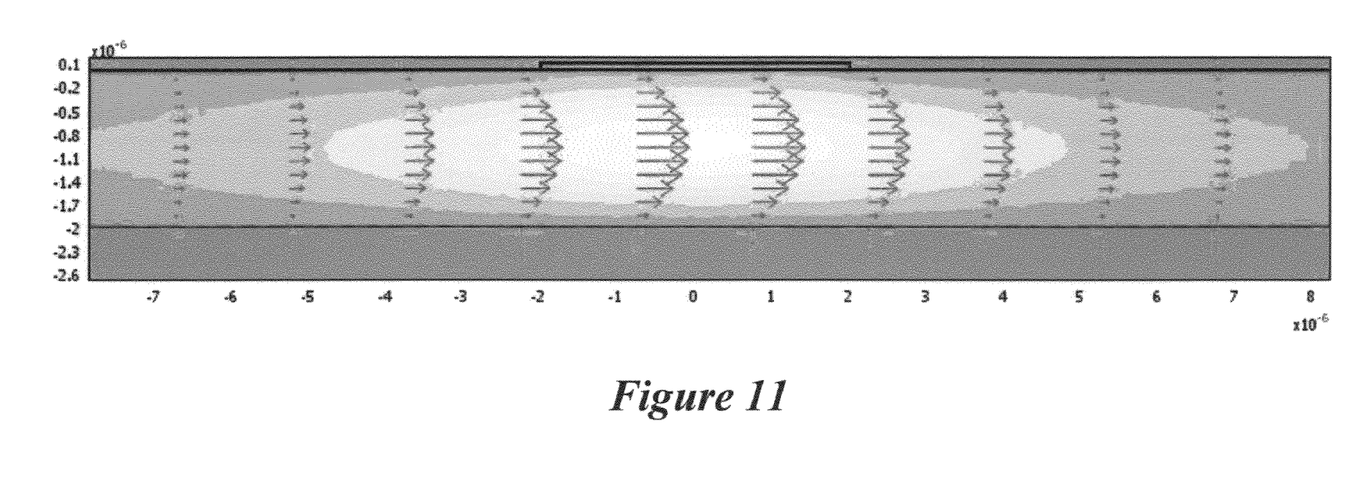
FIG. 11 depicts simulation results showing magnetic field amplitude of field distribution of guided hybrid dielectric/SPP waveguide mode for confinement in two directions in accordance with at least some embodiments of the present invention.

A simulation of an embodiment of the present invention incorporating a 4 micron wide strip of 80 nm thick silver on 20 nm of SiO2 on a 2 micron device layer of silicon on a 4 micron buried insulator (which resides on a bulk silicon substrate) yielded the field energy distribution shown in FIG. 11. FIG. 11 shows a surface with magnetic field amplitude of field distribution of guided hybrid dielectric/SPP waveguide mode for confinement in two directions. The arrows show the direction of the magnetic field, indicating that this is a TM mode, which is a requirement of surface plasmon induced modes.

With this configuration, because of how thin the cladding layer is, there are not two modes passing energy back and forth, but only one hybrid mode that is confined vertically due to the dielectric confinement and confined laterally due to a plasmonic interaction with the thin strip of metal on top of the oxide layer. This mode can be made single mode in addition to only guiding a single polarization. This is favorable for waveguiding applications as it removes birefringent effects that can adversely affect waveguide performance. Embodiments of this configuration may include easily fabricated SOI compatible waveguides for use telecommunications and other applications.

Further embodiments of this hybrid structure may include changing various parameters, such as the metal line width. Altering the metal line width may be particularly useful for applications involving telecommunications optics integrated on silicon microchips, as it affords control of confinement and propagation length.

Figure 12:
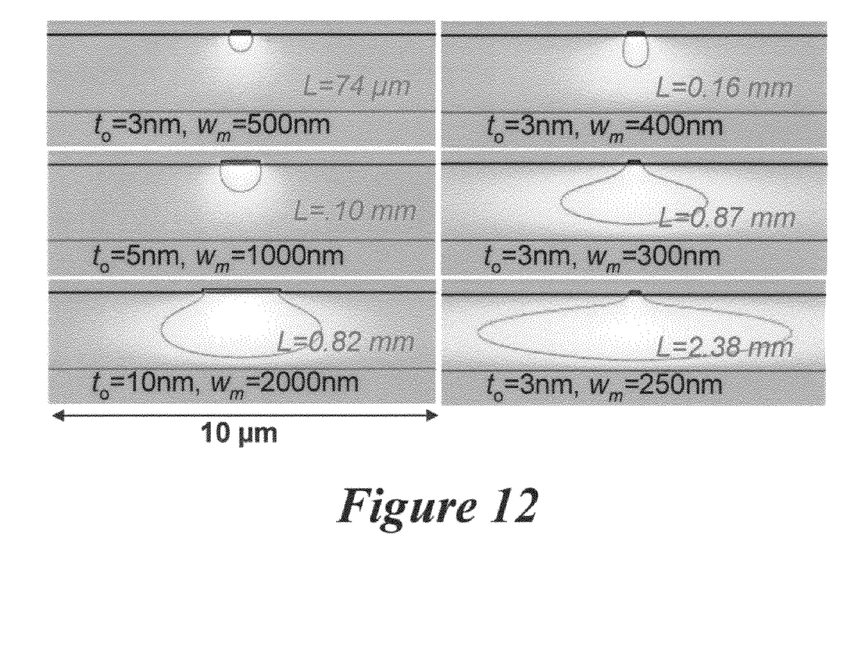
FIG. 12 depicts simulation results showing the magnetic field amplitude of field distribution of guided hybrid dielectric/SPP waveguide modes for confinement in two directions changing certain parameters in accordance with at least some embodiments of the present invention.

FIG. 12 shows the effect of different metal line widths and top oxide layer thicknesses. More specifically, FIG. 12 depicts a surface with magnetic field amplitude of field distribution of guided hybrid dielectric/SPP waveguide mode for confinement in two directions. As the top oxide thickness is changed from 10 to 5 to 3 nanometers, the confinement increases dramatically. Then as the width of the metal line is further decreased from 500 to 400 to 300 to 250 nm, confinement decreases while propagation length increases. Propagation lengths are in red, while parameters that are changed are in black. The single contour shown is the 1/e contour for the field strength.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A waveguide, comprising:
   a metal layer, comprising a grating structure;
   a dielectric waveguide layer, comprising a first surface and a second surface, the first surface configured to receive incident light and oriented away from the metal layer, and the second surface is oriented toward the metal layer such that incident light which has passed through the dielectric waveguide and reflected off the grating structure is received at the second surface; and
   a cladding layer disposed between the metal layer and the dielectric waveguide layer.

2. The waveguide of claim 1, wherein the cladding layer comprises an index of refraction that is lower than an index of refraction of the dielectric waveguide layer and wherein the dielectric waveguide layer comprises a dielectric transparent at a frequency of interest.

3. The waveguide of claim 1, further comprising:
   a substrate layer adjacent to the dielectric waveguide layer.

4. The waveguide of claim 3, wherein the substrate layer and the cladding layer each comprise an index of refraction that is lower than an index of refraction of the dielectric waveguide layer.

5. The waveguide of claim 4, wherein the index of refraction of the substrate layer is not equal to the index of refraction of the cladding layer.

6. The waveguide of claim 1, wherein the grating structure couples radiation at about 800 nm.

7. The waveguide of claim 6, wherein the grating structure comprises a periodicity of about 500 nm.

8. The waveguide of claim 7, wherein the grating structure comprises a depth of about 100 nm.

9. The waveguide of claim 1, wherein the grating structure couples infrared radiation.

10. The waveguide of claim 1, wherein one or more of the metal, cladding and dielectric waveguide layers have finite extent in a lateral direction perpendicular to a direction of wave propagation, wherein the waveguide is capable of 2-dimensional guiding.

* * * * *